United States Patent
Xu et al.

(10) Patent No.: US 10,582,428 B2
(45) Date of Patent: Mar. 3, 2020

(54) METHOD AND APPARATUS FOR PERFORMING A HANDOVER IN A WIRELESS COMMUNICATION SYSTEM

(71) Applicant: Samsung Electronics Co., Ltd, Gyeonggi-do (KR)

(72) Inventors: Lixiang Xu, Beijing (CN); Hong Wang, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/040,526

(22) Filed: Sep. 27, 2013

(65) Prior Publication Data

US 2014/0094146 A1     Apr. 3, 2014

(30) Foreign Application Priority Data

Sep. 29, 2012   (CN) .......................... 2012 1 0375016

(51) Int. Cl.
*H04W 36/00*   (2009.01)
*H04W 84/04*   (2009.01)

(52) U.S. Cl.
CPC ... *H04W 36/0077* (2013.01); *H04W 36/0055* (2013.01); *H04W 84/045* (2013.01)

(58) Field of Classification Search
CPC ......... H04W 36/0055; H04W 36/0077; H04W 84/045
USPC ........................................................ 455/411
See application file for complete search history.

(56) References Cited

U.S. PATENT DOCUMENTS

| | | | |
|---|---|---|---|
| 9,002,356 B2* | 4/2015 | Horn | H04W 36/08 370/331 |
| 2010/0157944 A1* | 6/2010 | Horn | 370/331 |
| 2010/0226314 A1 | 9/2010 | Xu | |
| 2010/0240373 A1* | 9/2010 | Ji | H04W 36/08 455/436 |
| 2010/0278147 A1* | 11/2010 | Horn | H04W 36/08 370/331 |
| 2011/0002292 A1 | 1/2011 | Wang et al. | |
| 2011/0171915 A1* | 7/2011 | Gomes | H04W 24/10 455/73 |
| 2011/0194462 A1* | 8/2011 | Wu | H04W 4/22 370/259 |
| 2011/0269465 A1 | 11/2011 | Xu et al. | |
| 2011/0294509 A1* | 12/2011 | Kim | H04W 36/24 455/436 |
| 2011/0314162 A1 | 12/2011 | Xu et al. | |
| 2012/0058792 A1 | 3/2012 | Liang et al. | |

(Continued)

FOREIGN PATENT DOCUMENTS

| | | |
|---|---|---|
| CN | 101400153 A | 4/2009 |
| CN | 101400160 A | 4/2009 |

(Continued)

OTHER PUBLICATIONS

Google Scholar Search Results.*

(Continued)

*Primary Examiner* — Qun Shen (57) ABSTRACT

Methods and apparatuses for verifying HeNB. A method reduces and/or avoids affecting the operator's network due to the attack from HeNB, and ensures the safety of the users who have accessed the network.

18 Claims, 7 Drawing Sheets

(56) References Cited

U.S. PATENT DOCUMENTS

| | | | |
|---|---|---|---|
| 2012/0058972 | A1 | 3/2012 | Tzortzis et al. |
| 2012/0094674 | A1* | 4/2012 | Wu .................. H04W 36/0055 455/437 |
| 2012/0108244 | A1 | 5/2012 | Shi et al. |
| 2012/0207128 | A1* | 8/2012 | Wang ................ H04W 36/0027 370/331 |
| 2012/0230296 | A1 | 9/2012 | Hapsari et al. |
| 2013/0017820 | A1* | 1/2013 | Drazynski ............ H04W 48/16 455/422.1 |
| 2013/0077515 | A1* | 3/2013 | Jung ..................... H04W 48/20 370/252 |
| 2013/0089076 | A1* | 4/2013 | Olvera-Hernandez ..................... H04W 36/22 370/332 |
| 2013/0322389 | A1 | 12/2013 | Maeda et al. |

FOREIGN PATENT DOCUMENTS

| | | |
|---|---|---|
| CN | 101521869 A | 9/2009 |
| JP | 2011-41236 A | 2/2011 |
| JP | 2011250263 A | 12/2011 |
| WO | 2010/129612 A1 | 11/2010 |
| WO | WO 2011/068213 A1 | 6/2011 |
| WO | 2011/136534 A2 | 11/2011 |
| WO | 2012/108399 A1 | 8/2012 |

OTHER PUBLICATIONS

Extended European Search Report dated May 16, 2014 in connection with European Patent Application No. 13186463.9, 26 pages.
Partial European Search Report dated Feb. 28, 2014 in connection with European Patent Application No. 13186463.9, 7 pages.
International Search Report dated Jan. 2, 2014 in connection with International Patent Application No. PCT/KR2013/008685, 3 pages.
Written Opinion of the International Searching Authority dated Jan. 2, 2014 in connection with International Patent Application No. PCT/KR2013/008685, 6 pages.
3GPP TS 33.320 V11.6.0, "3rd Generation Partnership Project; Technical Specification Group Services and System Aspects; Security of Home Node B (HNB) / Home evolved Node B (HeNB) (Release 11)", Jun. 2012, 41 pages.
Huawei, "Access Control for Inbound Handover to HeNB Subsystem", 3GPP TSG SA WG2 Meeting #75, Aug. 31-Sep. 4, 2009, Kyoto, Japan, TD S2-095874, 4 pages.
Qualcomm Europe, "Access Control for In-bound Handover to a CSG Cell", 3GPP TSG-RAN WG3 #65, Aug. 24-28, 2009, San Francisco, California, 6 pages.
Huawei, "Access Control for Inbound Handover to HeNB Subsystem", 3GPP TSG SA WG2 Meeting #75, Aug. 31-Sep. 4, 2009, Kyoto, Japan, TD S2-095142, 6 pages.
RAN3 Samsung, "Verification of HeNB", 3GPP TSG-RAN2 Meeting #80, New Orleans, Louisiana, Nov. 12-16, 2012, R2-125972, 3 pages.
Samsung, "Verification of HeNB", 3GPP TSG-RAN3 Meeting #77bis, #R3-122386, Lecce, Italy, Oct. 8-12, 2012, 6 pages.
3GPP TS 36.300 V11.3.0 (Sep. 2012), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)", 205 pages.
Stefania Sesia, et al., "LTE—The UMTS Long Term Evolution From Theory to Practice", Second Edition, Jul. 22, 2011, 193 pages.
Alcatel-Lucent, "Overall Solution for LTE inbound mobility", 3GPP TSG-RAN WG3 #65bis, 4 pages, R3-092385.
Philippe Godin, "LS on Emergency Call Handling and Closed Cells", 3GPP TSG RAN WG3 Meeting #73bis, 19 pages, R3-112707.
Office Action dated Dec. 4, 2017 in connection with Chinese Patent Application No. 201210375016.1.
Office Action dated Oct. 2, 2017 in connection with Japanese Patent Application No. 2015-534393.
Notice of Allowance dated Mar. 11, 2019 in connection with Japanese Patent Application No. 2015-534393, 10 pages.
Intellectual Property India, "Examination report under sections 12 & 13 of the Patents Act, 1970 and the Patents Rules, 2003," Application No. IN 464/KOLNP/2015, May 24, 2019, 6 pages.
Korean Intellectual Property Office, "Notification of the Reasons for Rejection," Application No. KR10-2013-0115040, dated Dec. 19, 2019, 10 pages.
3GPP TS 36.300 V11.1.0 (Mar. 2012), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Mar. 2012, 194 pages.
Nokia Siemens Networks, et al., "Access control for handover procedures to LTE CSG/hybrid cells," R3-092644, 3GPP TSG-RAN3 Meeting #65, Miyazaki, Japan, Oct. 12-15, 2009, 7 pages.
Ran3, et al., "Clarification on MME's support for inter-PLMN handover to CSG and hybrid cells," R2-123014, 3GPP TSG-Ran WG2 Meeting #78, Prague, Czech Republic, May 21-25, 2012, 6 pages.

* cited by examiner

FIG.1

(PRIOR ART)

METHOD AND APPARATUS FOR PERFORMING A HANDOVER IN A WIRELESS COMMUNICATION SYSTEM

CROSS-REFERENCE TO RELATED APPLICATION(S) AND CLAIM OF PRIORITY

The present application is related to and claims priority under 35 U.S.C. § 119(a) to Chinese Patent Application Serial No. 201210375016.1, which was filed in the Chinese Patent Office on Sep. 29, 2012, the entire disclosure of which is hereby incorporated by reference.

TECHNICAL FIELD

The present disclosure relates to a method and an apparatus for performing a handover in a wireless communication system.

BACKGROUND

In the current mobile communication system, in order to provide better services to a user group, a Closed Subscriber Group (CSG) needs to be formed with multiple Radio Resource Management (RRM) entities (i.e., network entities, such as base stations or cells in various mobile communication systems, in responsible for managing radio resources and access of user devices in a radio access network) for the specific user group. For instance, all users in a company or a school form a CSG, for providing specific access services. As for a specific user group, it is ubiquitous that a CSG is formed with multiple RRM entities in the mobile communication system. In order to more clearly describe the situation, the description is given hereafter taking the Long Term Evolution (LTE) of the System Architecture Evolution (SAE) for example.

Figure 1:
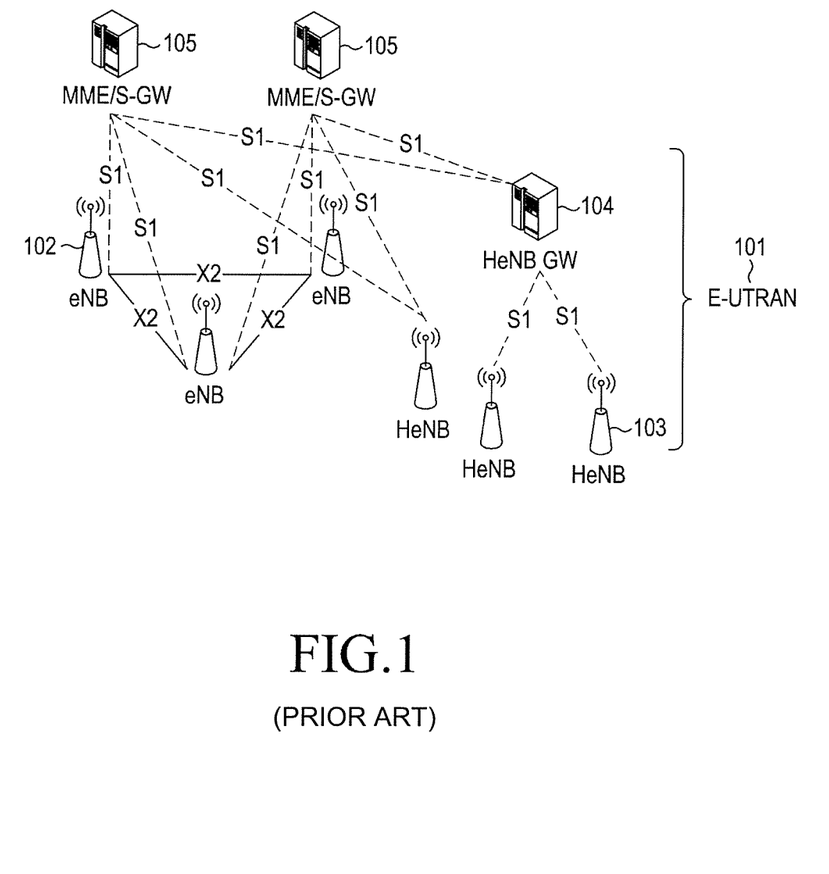
FIG. 1 illustrates a schematic diagram of the structure of an LTE system.

FIG. 1 illustrates a schematic diagram of the structure of a LTE system. As shown in FIG. 1, in the radio access network of the LTE system, the RRM entities include eNBs and Home eNBs (HeNBs). The radio access network may optionally include a HeNB GW. An eNB may directly connect with the Mobile Management Entity (MME) in the core network. When the radio access network includes the HeNB Gateway (GW), the HeNB needs to connect with the MME via a HeNB GW. When the network does not include the HeNB GW, the HeNB may directly connect with the MME.

As for the RRM entities in the LTE system, in order to provide more enriched access services, taking the HeNB for example, the conventional method provides several types including open, hybrid and CSG of the HeNB. The open-HeNB does not have a specific user group accessing the open-HeNB, and any UE may access the open-HeNB. The CSG-HeNB is a HeNB used by a user group formed by all the users in the company or the school mentioned above. The CSG-HeNB only permits the UEs in the specific user group served by the CSG-HeNB (For convenience of description, the UE in the specific user group is called the CSG UE) to access. The hybrid-HeNB not only forms a CSG with other HeNBs and permits the CSG UEs to access for convenience of providing better access services to the CSG UE, but also permits other non-CSG UEs (UEs which do not belong to this CSG) to access.

It can be seen from the above description that in the conventional mobile communication system, as for the RRM entities, the CSG is not only formed with multiple RRM entities to provide the CSG-RRM entity, such as the CSG-HeNB, and the hybrid-RMM entity, such as the hybrid-HeNB is also provided for providing more enriched access services. Meanwhile, the eNB may also support the CSG function, or is used as a hybrid-eNB while supporting the CSG function.

When the HeNB registers on the HeNB GW, the HeNB GW does not verify the HeNB, only the Safe Gateway (SeGW) verifies the HeNB. In this way, an attack HeNB may wiretap the information of the accessed UE using the ID of another HeNB. At present, there is no scheme on the network side to prevent this kind of HeNB attack. Therefore, the 3GPP puts forward a required for verifying the ID of the HeNB and the message of the accessed UE by the HeNB GW or the MME.

Especially, as for the UE accessing the HeNB via the S1 handover procedure, how to verify the message of the UE accessed to the HeNB is not solved.

SUMMARY

To address the above-discussed deficiencies, it is a primary object to provide a method and an apparatus for performing a handover in a wireless communication system, and a method and an apparatus for verifying a HeNB, which may avoid affecting the operator's network due to the attack from the eNB, and ensure the safety of the users who have accessed the network.

In order to achieve the above object, the technical scheme of the present disclosure is implemented as follows.

A method for verifying a Home eNB (HeNB) includes sending, by a Mobile Management Entity (MME), an access mode of a target HeNB received from a source eNB to a HeNB Gateway (GW); and verifying, by the HeNB GW, validity of the access mode of the target HeNB.

It should be noted that the MME further sends a CSG ID to the HeNB GW, and the HeNB GW verifies the validity of the CSG ID of the target HeNB if a target cell is in a CSG mode.

It should be noted that the access mode sent from the source eNB to the MME and/or the access mode sent from the MME to the HeNB GW includes an open mode, and the HeNB GW verifies the validity of the access mode of the target HeNB in the open mode.

It should be noted that the HeNB GW determinates that a target cell is in an open mode according to the access mode in the message received from the MME and absence of a CSG ID, and the HeNB GW verifies the validity of the access mode of the target HeNB in the open mode.

It should be noted that the HeNB GW determines that a target cell is in a hybrid mode according to a membership status and a CSG ID in the message received from the MME, and the HeNB GW verifies the validity of the access mode of the target HeNB in the hybrid mode.

The present disclosure provides another method for verifying a HeNB, including: receiving, by a target HeNB, a handover request message; sending, by the target HeNB, the target HeNB's access mode and CSG ID to an upper layer node of the target HeNB; verifying, by the upper layer node of the target HeNB, validity of the access mode of the target HeNB, and verifying validity of the CSG ID of the target HeNB if the access mode is a CSG mode.

It should be noted that in a situation that a HeNB GW is deployed, the upper layer node of the target HeNB is the HeNB GW.

It should be noted that in a situation that a HeNB GW is not deployed, the upper layer node of the target HeNB is an MME.

The present disclosure provides another method for verifying a HeNB, including: sending, by a source eNB, a handover required message to an MME, wherein the handover required message comprises an access mode of a target HeNB and a CSG ID; verifying, by the MME, validity of the access mode of the target HeNB, and verifying validity of the CSG ID of the target HeNB if the access mode is a CSG mode.

The present disclosure provides another method for verifying a HeNB, including: sending, by a source eNB, a handover required message to an MME; sending, by the MME, a handover request message to a HeNB GW; sending, by the HeNB GW, the handover request message to a target HeNB; sending, by the target HeNB, a handover request acknowledgement message to the HeNB GW, wherein if the target cell is a CSG cell or a hybrid cell, the target HeNB includes the target HeNB's CSG ID in the handover request acknowledgement message, and the handover request acknowledgement message includes the access mode of the target cell; verifying, by the HeNB GW, validity of the access mode of the target. HeNB; verifying validity of the CSG ID of the target HeNB if the target cell is a CSG cell; sending, by the HeNB GW, the handover request acknowledgement message to the MME; sending, by the MME, a handover command to the source eNB; sending, by the source eNB, the handover command to a UE.

The present disclosure provides another method for verifying a HeNB, including: sending, by a source eNB, a handover required message to an MME; sending, by the MME, the handover request message to a target HeNB; sending, by the target HeNB, a handover request acknowledgement message to the MME; wherein if the target cell is a CSG cell or a hybrid cell, the target HeNB includes the target HeNB's CSG ID in the handover request acknowledgement message, and the handover request acknowledgement message includes the access mode of the target cell; verifying, by the MME, validity of the access mode of the target HeNB in case of no HeNB GW deployment; verifying validity of the CSG ID of the target HeNB if the target cell is a CSG cell; sending, by the MME, a handover command to the source eNB; sending, by the source eNB, the handover command to a UE.

In can be seen from the above technical scheme that with the method for verifying the HeNB provided by embodiments of the present disclosure, it may be avoided that the operator's network is affected due to the attack from the HeNB, and ensure the safety of the users who have accessed the network.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed herein, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The present disclosure is further described in detail hereinafter with reference to the accompanying drawings to make the objective, technical solution and merits thereof more apparent.

Figure 2:
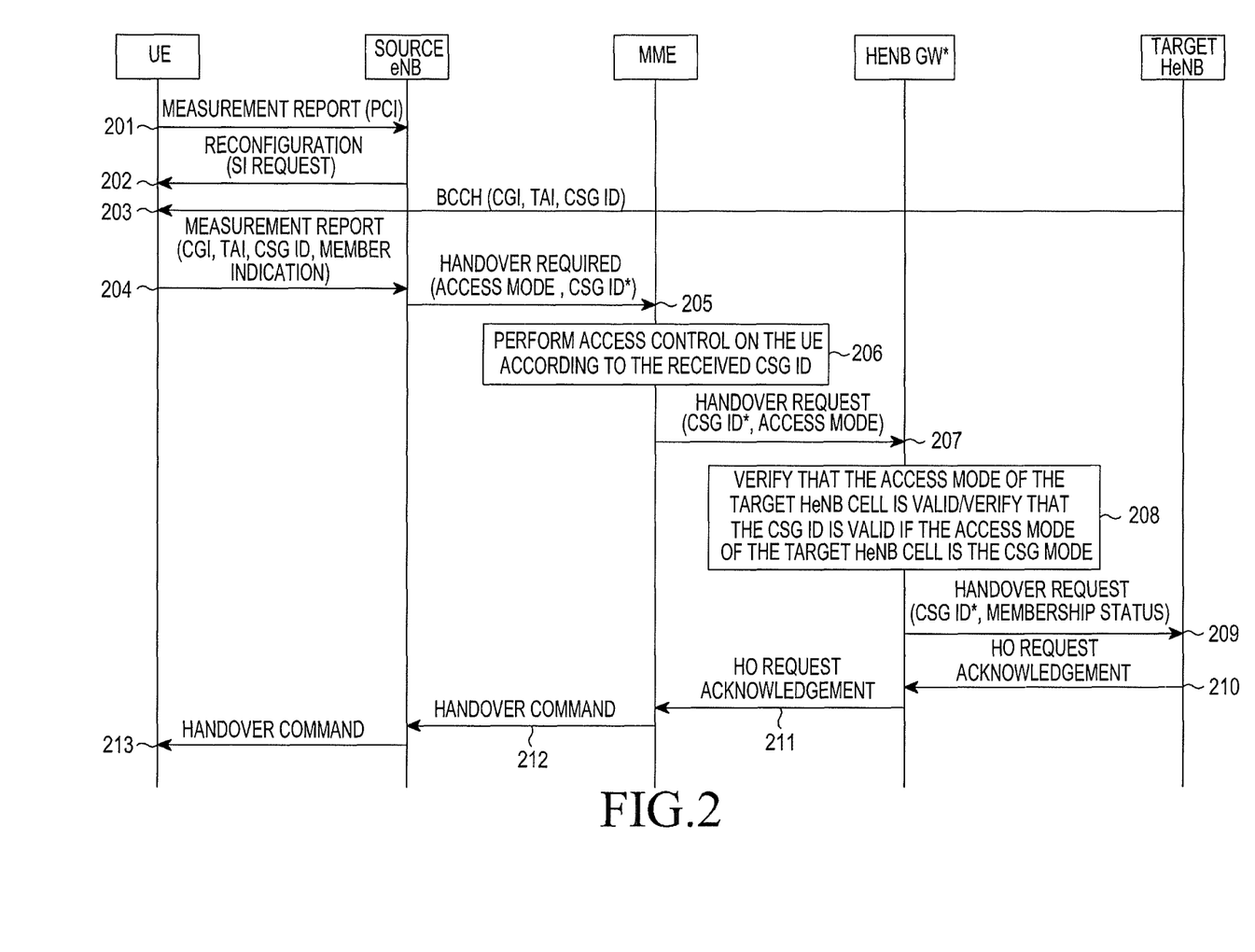
FIG. 2 illustrates a process flow diagram for a first embodiment for verifying a HeNB in accordance with the various embodiments of the present disclosure.

Embodiment one: a first embodiment of the present disclosure for verifying a HeNB is illustrated in FIG. 2. In this embodiment, a HeNB GW is deployed, and the HeNB accesses a core network via the HeNB GW. In this embodiment, the HeNB GW verifies the HeNB according to information of a target HeNB received from a MME. The embodiment is described hereafter in detail. In the interests of brevity, additional blocks that may be present in the process for verifying the HeNB are not described here in detail.

In block 201, a UE sends a measurement report to a source eNB.

The measurement report includes a Physical Cell Identity (PCI) of the measurement cell.

In block 202, the source eNB configures a System Information (SI) request of a cell and a report corresponding to the specific PCI executed by the UE.

In block 203, a target HeNB broadcasts a cell ID, Tacking Area Identity (TAI) and CSG ID of a cell controlled by the target HeNB.

In block 204, the UE sends the measurement report to the source eNB.

The UE obtains relevant system information of the target HeNB via an automatic gap.

The measurement report includes an E-UTRAN Cell Global Identifier (ECGI), a Tracking Area Code (TAC), the CSG ID and a member indication of the target HeNB.

In block 205, the source eNB sends a handover required message to the MME.

The handover required message includes the ECGI and CSG ID of the target HeNB cell. Furthermore, if the target cell is in a hybrid access mode, the handover required message further includes information indicating that the access mode of the cell is a hybrid mode. If the target cell is in an open access mode, the handover required message may further include information indicating that the cell access mode is the open mode. In this case, the corresponding CSI ID is not carried. In an alternative, when the target HeNB is in the open mode, the access mode needs not to be carried. The MME determines that the target HeNB is in the open mode according to the access mode, absence of the CSG ID and information indicating that the target eNB ID is a 28 bits, and verifies the access mode of the target HeNB in block 208.

In block 206, the MME performs access control on the UE according to the received CSG ID and saved subscription CSG information of the UE.

In this block, if the access control fails, the MME sends a handover preparation failure message to the source eNB to terminate the handover process. And, if the handover required message includes information indicating that the access mode is the hybrid mode, the MME determines a membership status of the UE, and sends the membership status to the target HeNB via the handover request message.

In block 207, the MME sends the handover request message to the target $GW_o$ The handover request message includes the CSG ID. If the target cell is in the hybrid access mode, the message further includes a CSG member indication. The handover request message further includes the access mode. The access mode may include the hybrid mode. The access mode may further include the open mode, and the CSG ID is not included in this case. In the alternative, when the target HeNB is in the open mode, the handover request message sent from the MME needs not to carry the access mode and the CSG ID. The HeNB GW determines that the target HeNB is in the open mode according to the access mode and the absence of the CSG ID, and verifies the access mode of the target HeNB in the open mode in block 208. The message may further not carry an information element access mode, the HeNB GW determines that the target HeNB cell is in the CSG mode according to the CSG ID and the absence of membership status, determines that the target HeNB cell is in the hybrid mode according to the CSG ID and the membership status, determines that the target HeNB cell is in the open mode according to the absence of the CSG ID and the membership status, and verifies the validity of the access mode of the target HeNB in block 208.

In block 208, the HeNB GW verifies that the access mode of the target HeNB is valid. If the target cell is the CSG cell, the HeNB GW verifies that the CSG ID of target HeNB cell is valid.

In block 209, the HeNB GW sends the handover request message to the target HeNB.

In block 210, the target HeNB sends a handover request acknowledgement message to the HeNB GW.

In block 211, the HeNB GW sends the handover request acknowledgement message to the MME.

In block 212, the MME sends a handover command message to the source eNB.

In block 213, the source eNB sends a handover command message to the UE.

Till then, the description of the whole work flow of the first embodiment of the present disclosure is finished.

Figure 3:
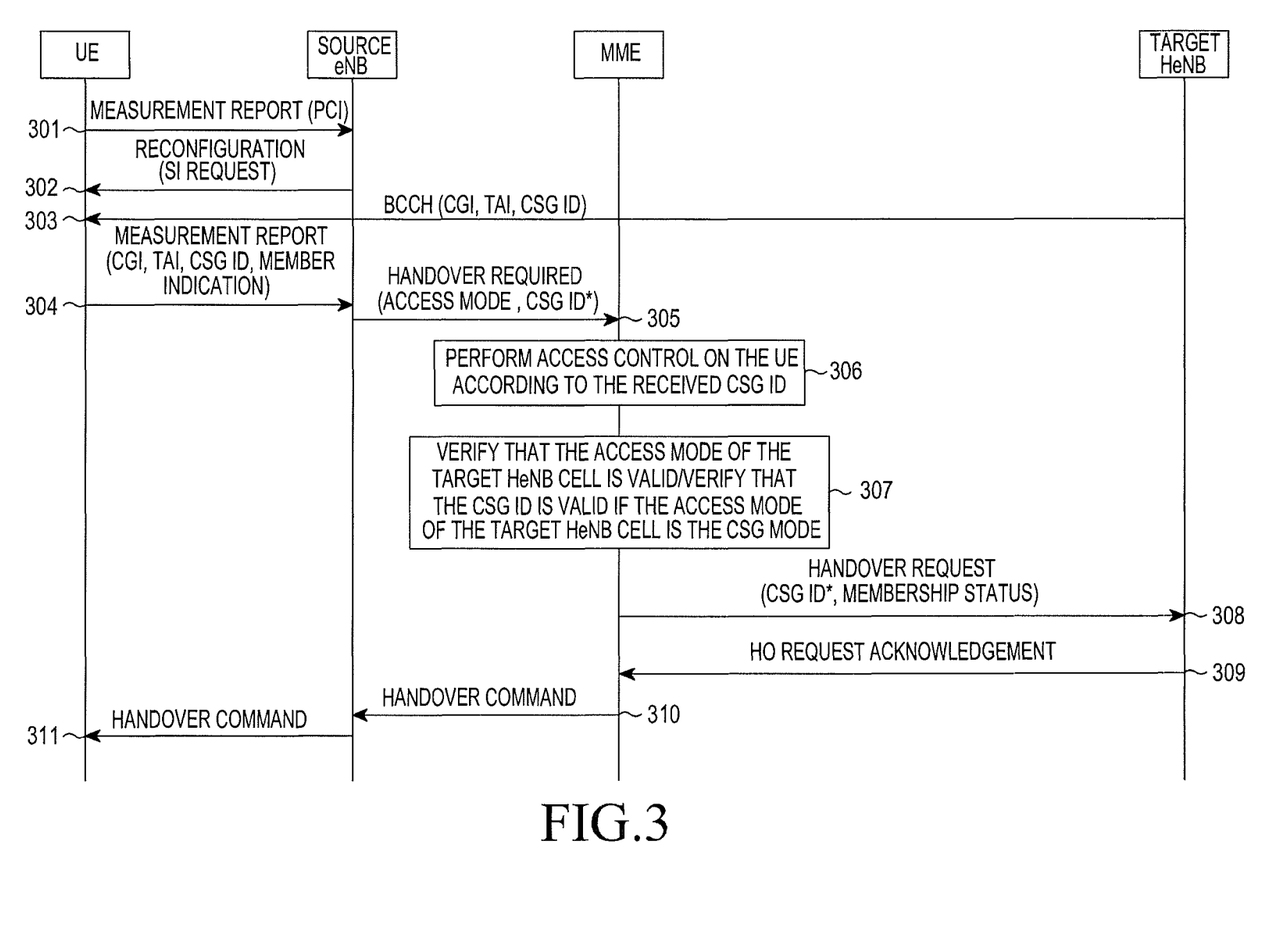
FIG. 3 illustrates a process flow diagram for a second embodiment for verifying a HeNB in accordance with the various embodiments of the present disclosure.

Embodiment two: a second embodiment of the present disclosure for verifying a HeNB is illustrated in FIG. 3. In this embodiment, a HeNB GW is not deployed. In this embodiment, an MME verifies the HeNB according to information received from a source eNB. The embodiment is described hereafter in detail. In the interests of brevity, additional blocks that may be present in the process for verifying the HeNB are not described here in detail.

In block 301, a UE sends a measurement report to a source eNB.

The measurement report includes a Physical Cell Identity (PCI) of the measurement cell.

In block 302, the source eNB configures a System Information (SI) request of a cell and a report corresponding to the specific PCI executed by the UE.

In block 303, a target HeNB broadcasts a cell ID, Tacking Area Identity (TAI) and CSG ID of a cell controlled by the target HeNB.

In block 304, the UE sends the measurement report to the source eNB.

The UE obtains relevant system information of the target HeNB via an automatic gap.

The measurement report includes an E-UTRAN Cell Global Identifier (ECGI), a Tracking Area Code (TAC), the CSG ID and a member indication of the target HeNB.

In block 305, the source eNB sends a handover required message to the MME.

The handover required message includes the ECGI and CSG ID of the target HeNB cell. Furthermore, if the target cell is in a hybrid access mode, the handover required message further includes information indicating that the access mode of the cell is a hybrid mode. If the target cell is in an open access mode, the handover required message may further include information indicating that the cell access mode is the open mode. In this case, the corresponding CSI ID is not carried. In an alternative, when the target HeNB is in the open mode, the message needs not to include the access mode and the CSG ID. The MME determines that the target HeNB is in the open mode according to the access mode, absence of the CSG ID and information indicating that the ID of the target eNB is a 28 bits HeNB ID, and verifies the access mode of the target HeNB in the open mode in block 307.

In block 306, the MME performs access control on the UE according to the received CSG ID and saved subscription CSG information of the UE.

In this block, if the access control fails, the MME sends a handover preparation failure message to the source eNB to terminate the handover process. And, if the handover required message includes information indicating that the access mode is the hybrid mode, the MME determines a membership status of the UE, and sends the membership status to the target HeNB via the handover request message.

In block 307, the MME verifies that the access mode of the target HeNB is valid. If the target cell is the CSG cell, the MME verifies that the CSG ID of the target HeNB cell is valid.

There is no absolute sequence between block 306 and block 307.

In block 308, the MME sends a handover request message to the target HeNB.

The handover request message includes the CSG ID. If the target cell is in the hybrid access mode, the message may further includes a CSG member indication.

In block 309, the target HeNB sends a handover request acknowledgement message to the MME.

In block 310, the MME sends a handover command message to the source eNB.

In block 311, the source eNB sends the handover command message to the UE.

Till then, the description of the whole work flow of the second embodiment of the present disclosure is finished.

Figure 4:
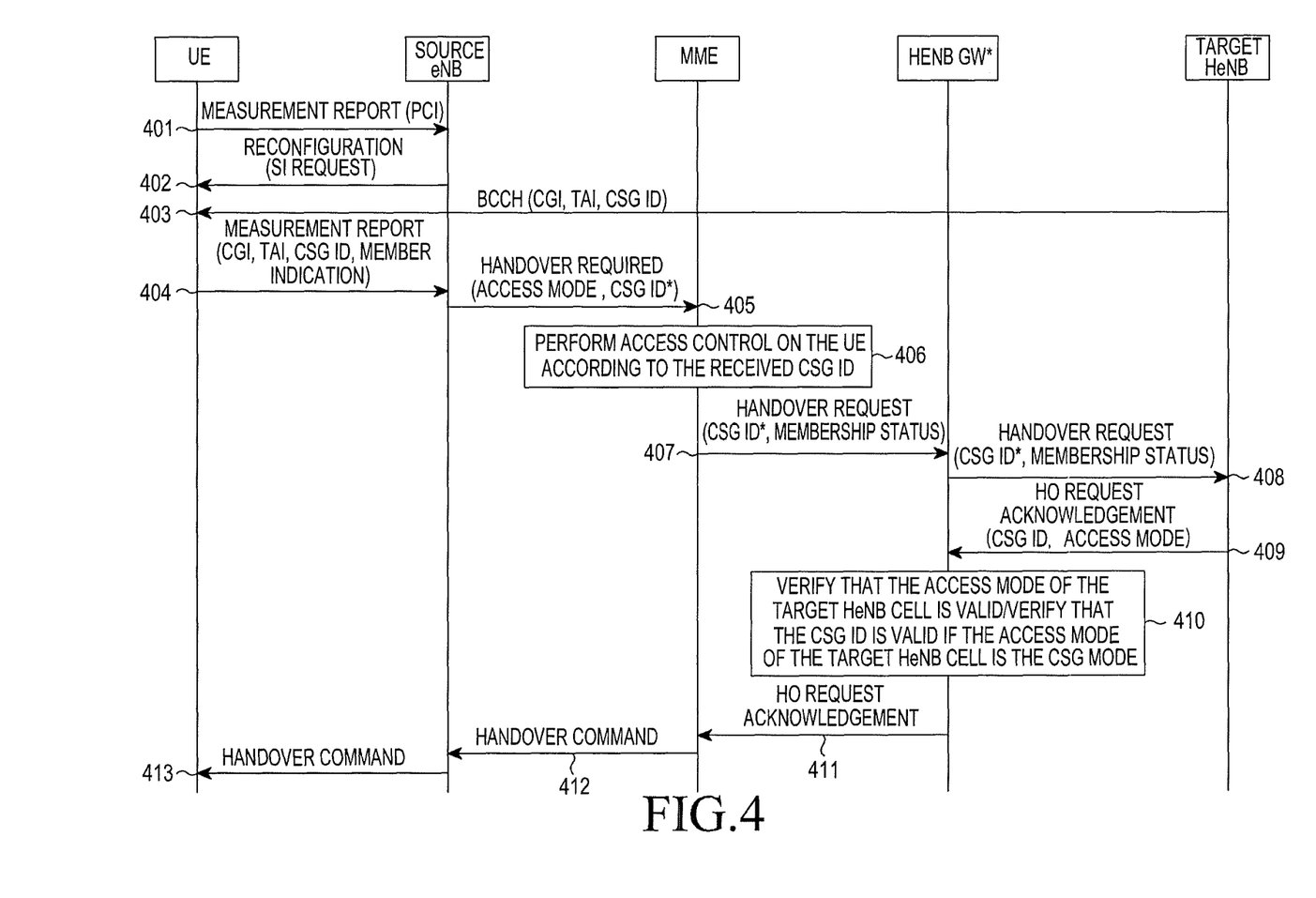
FIG. 4 illustrates a process flow diagram for third embodiment for verifying a HeNB in accordance with the various embodiments of the present disclosure.

Embodiment three: a third embodiment of the present disclosure for verifying a HeNB is illustrated in FIG. 4. In this embodiment, a HeNB GW is deployed, and the HeNB accesses a core network via the HeNB GW. In this embodiment, the HeNB GW verifies the HeNB according to information received from a target HeNB. The embodiment is described hereafter in detail. In the interests of brevity, additional blocks that may be present in the process for verifying the HeNB are not described here in detail.

Blocks 401 to 404 are the same as blocks 201 to 204, which are not repeated here.

In block 405, the source eNB sends a handover required message to the MME.

The handover required message includes the ECGI and CSG ID of the target HeNB cell. Furthermore, if the target cell is in a hybrid access mode, the handover required message further includes information indicating that the access mode of the cell is a hybrid mode.

In block 406, the MME performs access control on the UE according to the received CSG ID and saved subscription CSG information of the UE.

In this block, if the access control fails, the MME sends a handover preparation failure message to the source eNB to terminate the handover process. And, if the handover required message includes information indicating that the access mode is the hybrid mode, the MME determines a membership status of the UE, and sends the membership status to the target HeNB via the handover request message.

In block 407, the MME sends the handover request message to the target $GW_o$

The handover request message includes the CSG ID. If the target cell is in the hybrid access mode, the message further includes a CSG member indication.

In block 408, the HeNB GW sends the handover request message to the HeNB.

In block 409, the target HeNB sends a handover request acknowledgement message to the HeNB GW. The handover request acknowledgement message includes the access mode of the target HeNB cell. If the target HeNB cell is the type of the CSG or the type of the hybrid, the message further includes the CSG ID. The access mode includes the hybrid access mode. The access mode may further include the open mode. If the access mode is the open mode, the corresponding CSG ID is not included. In an alternative, when the target HeNB is in the open mode, the target HeNB needs not to include the access mode and the CSG ID. The HeNB GW determines that the target HeNB is in the open mode according to the absence of the access mode and the CSG ID, and verifies the access mode of the target HeNB in the open mode in block 410.

In block 410, the HeNB GW verifies that the access mode of the target HeNB is valid. If the target cell is the CSG cell, the HeNB GW verifies that the CSG ID of the target HeNB cell is valid.

Blocks 411 to blocks 413 may be performed similarly to the description of blocks 211 to 213 and a description thereof is not repeated here in the interests of brevity.

Till then, the description of the whole work flow of the third embodiment of the present disclosure is finished.

Figure 5:
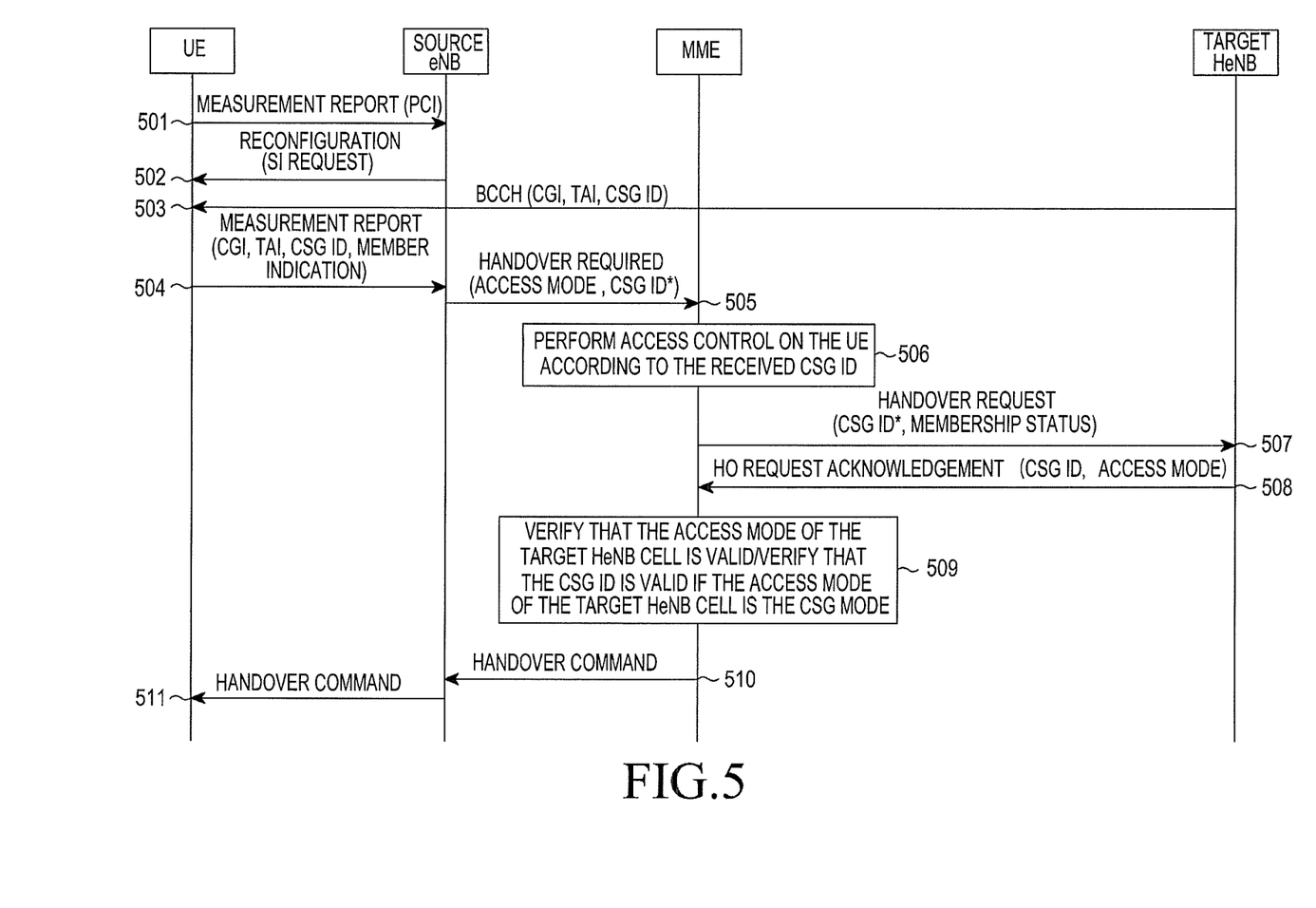
FIG. 5 illustrates a process flow diagram for a fourth embodiment for verifying a HeNB in accordance with the various embodiments of the present disclosure.

Embodiment four: a fourth embodiment of the present disclosure for verifying a HeNB is illustrated in FIG. 5. In this embodiment, a HeNB GW is not deployed. In this embodiment, an MME verifies the HeNB according to information received from a target HeNB. The embodiment is described hereafter in detail. In the interests of brevity, additional blocks that may be present in the process for verifying the HeNB are not described here in detail.

Blocks 501 to 504 may be performed similarly to the description of blocks 301 to 304, and a description thereof is not repeated here in the interests of brevity.

In block 505, the source eNB sends a handover required message to the MME.

The handover required message includes the ECGI and CSG ID of the target HeNB cell. Furthermore, if the target cell is in a hybrid access mode, the handover required message further includes information indicating that the access mode of the cell is a hybrid mode.

In block 506, the MME performs access control on the UE according to the received CSG ID and saved subscription CSG information of the UE.

In this block, if the access control fails, the MME sends a handover preparation failure message to the source eNB to terminate the handover process. And, if the handover required message includes information indicating that the access mode is the hybrid mode, the MME determines a membership status of the UE, and sends the membership status to the target HeNB via a handover request message.

In block 507, the MME sends the handover request message to the target HeNB.

The handover request message includes the CSG ID. If the target cell is in the hybrid access mode, the message further includes the CSG member indication.

In block 508, the target HeNB sends a handover request acknowledgement message to the MME. The handover request acknowledgement message includes the access mode of the target HeNB cell. If the target HeNB cell is the type of the CSG or the type of the hybrid, the message further includes the CSG ID. The access mode includes the hybrid access mode. The access mode may further include the open mode. If the access mode is the open mode, the corresponding CSG ID is not included. In an alternative, when the target HeNB is in the open mode, the target HeNB needs not to include the access mode and the CSG ID. The MME determines that the target HeNB is in the open mode according to the absence of the access mode and the CSG ID, and the information that the ID of the target eNB is a 28 bits HeNB ID, and verifies the access mode of the target HeNB in the open mode in block 509.

In block 509, the MME verifies that the access mode of the target HeNB is valid. If the target cell is the CSG cell, the MME verifies that the CSG ID of the target HeNB cell is valid.

Blocks 510 and 511 are the same as the blocks 310 and 311, which are not repeated here.

Till then, the description of the whole work flow of the fourth embodiment of the present disclosure is finished.

Figure 6:
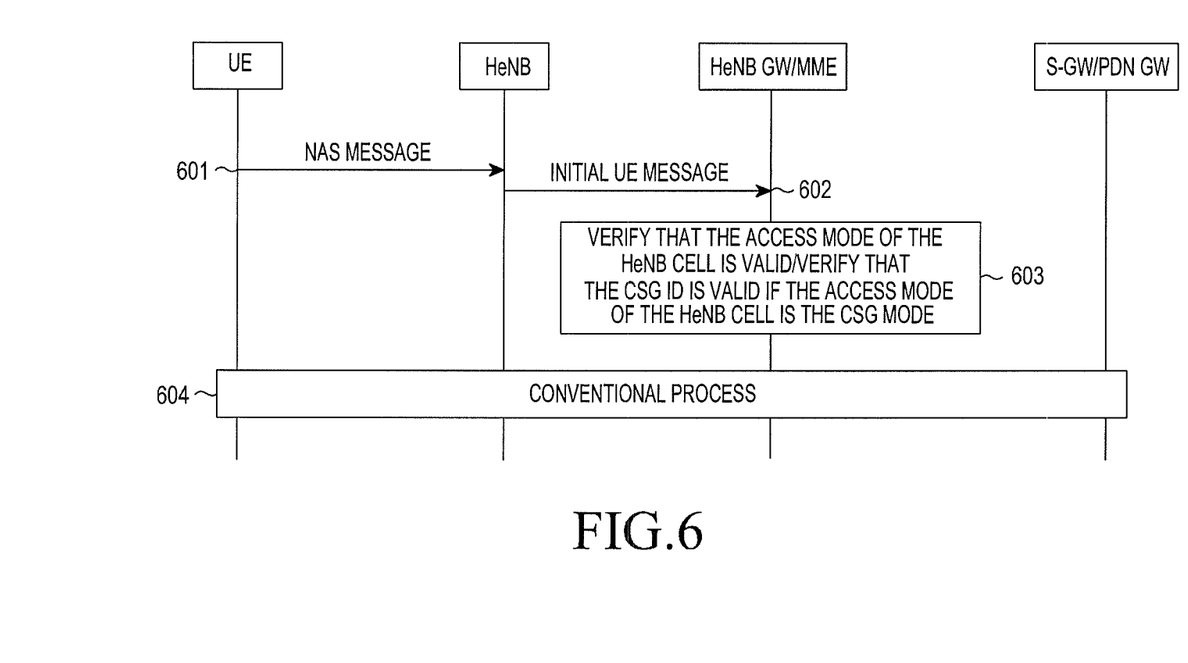
FIG. 6 illustrates a process flow diagram for a fifth embodiment for verifying a HeNB in accordance with the various embodiments of the present disclosure.

Embodiment five: a fifth embodiment of the present disclosure for verifying a HeNB is illustrated in FIG. 6. In this embodiment, in the process that the UE initially accesses the HeNB, the HeNB GW or the MME verifies the HeNB according to information received from the HeNB.

The embodiment is described hereafter in detail. In the interests of brevity, additional blocks that may be present in the process for verifying the HeNB are not described here in detail.

In block 601, the UE sends an NAS message, such as an Attach message or a TA update request message, to the HeNB. In this block, the UE may send the UL NAS message to the HeNB via UL information transmission or RRC connection establishment.

In block 602, the HeNB sends an initial UE message to the HeNB GW or the MME. The message includes the NAS message received from the UE. In a situation that the HeNB GW is deployed, the message is sent to the HeNB GW first, and sent to the MME via the HeNB GW. In a situation that the HeNB GW is not deployed, the message is directly sent to the MME.

The initial UE message includes the CSG ID of the HeNB cell. Furthermore, if the HeNB cell is in a hybrid access mode, the initial UE message further includes information indicating that the access mode of the cell is a hybrid mode. If the target cell is in an open access mode, the initial UE message may further include information indicating that the cell access mode is the open mode. In this case, the corresponding CSG ID is not included. In an alternative, when the HeNB is in the open mode, HeNB needs not to include the access mode and the CSG ID. The HeNB GW determines that the target HeNB is in the open mode according to the access mode and absence of the CSG ID. In the situation that the HeNB GW is not deployed, the MME determines that the HeNB is in the open mode according to the access mode, absence of the CSG ID and information indicating that the ID of the eNB is a 28 bits HeNB ID, and verifies the access mode of the target HeNB in the open mode in block 603.

In block 603, the HeNB GW or the MME verifies that the access mode of the target HeNB is valid. If the target cell is the CSG cell, the HeNB GW or the MME verifies that the CSG ID of the target HeNB cell is valid.

In the situation that the HeNB GW is deployed, the above verification is performed by the HeNB GW. In the situation that the HeNB GW is not deployed, the above verification is performed by the MME.

In the situation that the HeNB GW is deployed, the HeNB GW sends the initial UE message to the MME.

In block 604, other processes may be the same as those in the conventional method, which are not repeated here.

Till then, the description of the whole work flow of the fifth embodiment of the present disclosure is finished.

Figure 7:
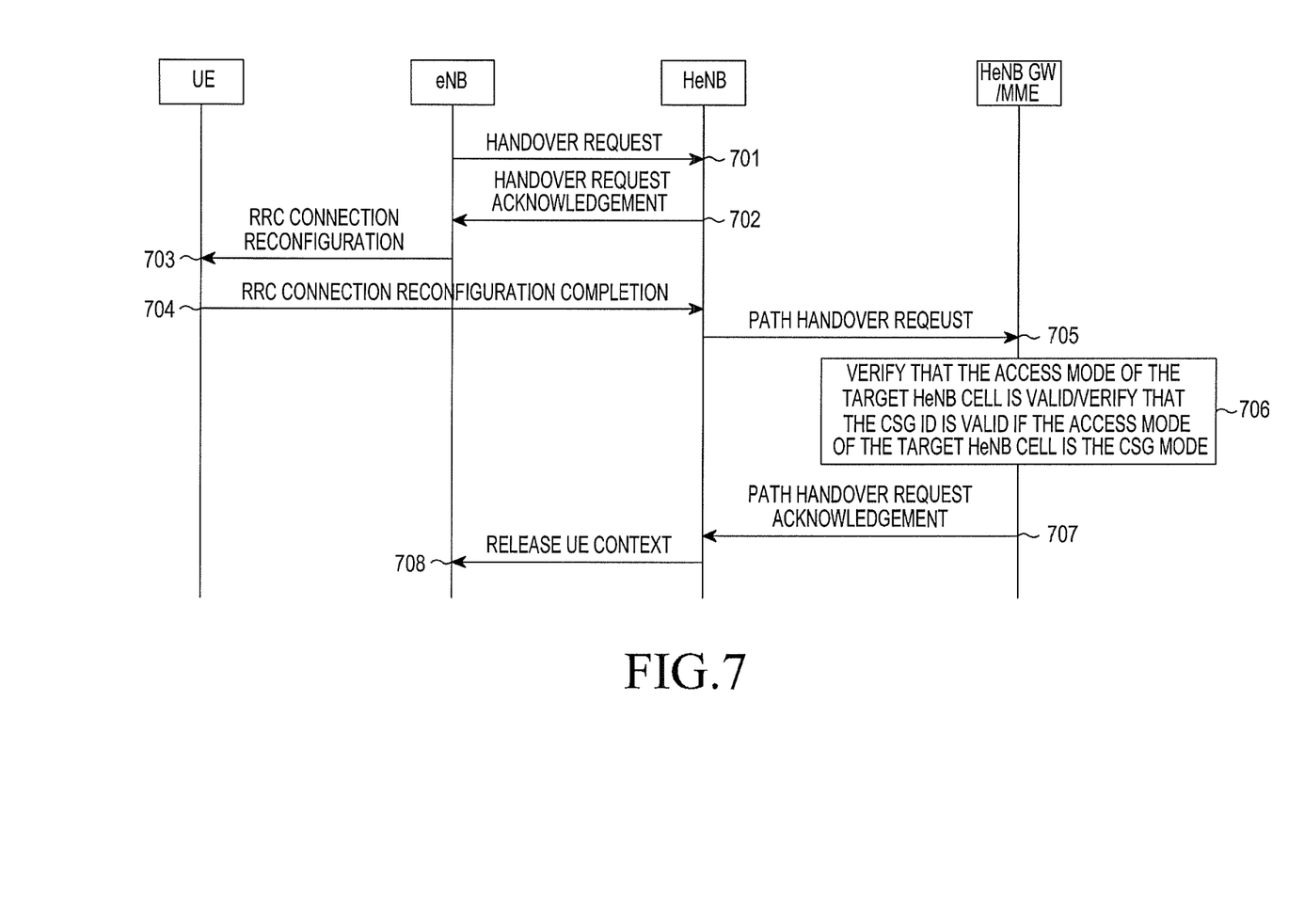
FIG. 7 illustrates a process flow diagram for a sixth embodiment for verifying a HeNB in accordance with the various embodiments of the present disclosure.

Embodiment six: a sixth embodiment of the present disclosure for verifying a HeNB is illustrated in FIG. 7. In this embodiment, in the process that a UE accesses the HeNB via X2 handover, a HeNB GW or an MME verifies the HeNB according to information received from the HeNB. The embodiment is described hereafter in detail. In the interests of brevity, additional blocks that may be present in the process for verifying the HeNB are not described here in detail.

In block 701, an eNB sends a handover request message to the HeNB.

In block 702, the HeNB sends a handover request acknowledgement message to the eNB.

In block 703, the eNB sends an RRC connection reconfiguration message to the UE.

In block 704, the UE sends an RRC connection reconfiguration completion message to the HeNB.

In block 705, the HeNB sends a path hand over request message to the HeNB GW or MME. In a situation that the HeNB GW is deployed, the message is sent to the HeNB GW, and sent to the MME via the HeNB GW. In a situation that the HeNB GW is not deployed, the message is directly sent to the MME.

The path handover request message includes the CSG ID of the HeNB cell. Furthermore, if the HeNB cell is in a hybrid access mode, path handover request message further includes information indicating that the access mode of the cell is a hybrid mode. If the target cell is in an open access mode, the path handover request message may further include information indicating that the cell access mode is the open mode. In this case, the corresponding CSI ID is not included. In an alternative, when the HeNB is in the open mode, HeNB needs not to include the access mode and the CSG ID. The HeNB GW determines that the target HeNB is in the open mode according to the access mode and absence of the CSG ID. In the situation that the HeNB GW is not deployed, the MME determines that the target HeNB is in the open mode according to the access mode, absence of the CSG ID and information indicating that the ID of the eNB is a 28 bits HeNB ID, and verifies the access mode of the target HeNB in the open mode in block 706.

In block 706, the HeNB GW or the MME verifies that the access mode of the target HeNB is valid. If the target cell is the CSG cell, the HeNB GW or the MME verifies that the CSG ID of the target HeNB cell is valid.

In the situation that the HeNB GW is deployed, the above verification is performed by the HeNB GW. In the situation that the HeNB GW is not deployed, the above verification is performed by the MME.

In the situation that the HeNB GW is deployed, the HeNB GW sends the path handover request to the MME.

In block 707, the HeNB receives a path handover request acknowledgement message. In the situation that the HeNB GW is not deployed, the message is sent from the MME to the HeNB. In the situation that the HeNB GW is deployed, the message is sent to the HeNB from the MME via the HeNB GW.

In block 708, the HeNB sends a message for releasing UE contexts to the eNB.

Till then, the description of the whole work flow of the sixth embodiment of the present disclosure is finished.

Embodiment seven. The seventh embodiment of the present disclosure for verifying a HeNB includes: In the process that the UE accesses the HeNB via the S1 handover, in the situation that the HeNB GW is deployed, the HeNB GW verifies the HeNB twice. For example, the first verification maybe the same as that in the first embodiment, i.e. FIG. 2. The HeNB GW verifies the HeNB according to the information received from the MME, to terminate the access and the attack made by the UE to the eNB as soon as possible via this verification. In order to avoid that the UE provides error information to the source eNB, the second verification is the same as that in the third embodiment, i.e., FIG. 4. The HeNB GW verifies the HeNB according to the information sent from the target HeNB to ensure that the information received from the UE in the first verification is correct. Through the verification mentioned above, the incomplete verification is avoided on the basis of ensuring that the verification is performed as soon as possible.

Similarly, in the situation that the HeNB GW is not deployed, in the process that the UE accesses the HeNB via the S1 handover, the MME verifies the HeNB twice. The first verification is the same as that in the second embodiment, i.e. FIG. 3. The MME verifies the HeNB according to the information received from the source eNB, to terminate the access and attack made by the UE to the eNB as soon as possible via this verification. In order to avoid that the UE provides error information to the source eNB, the second verification is the same as that in the fourth embodiment, i.e., FIG. 5. The MME verifies the HeNB according to the information sent from the target HeNB to ensure that the information received from the UE in the first verification is correct. Through the verification mentioned above, the incomplete verification is avoided on the basis of ensuring that the verification is performed as soon as possible.

Till then, the description of the whole work flow of the seventh embodiment of the present disclosure is finished.

In view of the above, the method for verifying the HeNB provided by the embodiments of the present disclosure may avoid affecting the operator's network due to the attack from the HeNB, and ensure the safety of the users who have accessed the operator's network.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to perform a handover for a user equipment (UE) performed by a mobile management entity (MME) in a wireless communication system, the method comprising:
    receiving, from a source evolved node b (eNB), a handover required message including a closed subscriber group (CSG) identity (ID) of a cell served by a target home eNB (HeNB) and an access mode of the target HeNB;
    performing access control of the UE based on the CSG ID and CSG subscription information of the UE;
    transmitting, to the target HeNB, a handover request message including the CSG ID and a CSG membership status for indicating that the UE is a CSG member;
    receiving, from the target HeNB, a handover request acknowledgement message including the CSG ID of the target HeNB and the access mode;
    performing, by the MME, a verification for the access mode of the target HeNB received from the target HeNB, wherein performing the verification comprises:
        determining that the access mode of the target HeNB received from the target HeNB is a closed access mode, and
        identifying whether the CSG ID is valid for the target HeNB when the access mode of the target HeNB is the closed access mode; and
    transmitting, to the source eNB, a handover command message based on the verification.

2. A method to perform a handover for a user equipment (UE) by a home evolved node b (HeNB) gateway in a wireless communication system, the method comprising:
    receiving, from a source eNB, a handover request message including a closed subscriber group (CSG) identity (ID) of a cell served by a target HeNB and a CSG membership status for indicating that the UE is a CSG member;
    transmitting, to the target HeNB, the handover request message;
    receiving, from the target HeNB, a handover request acknowledgement message including the CSG ID of the target HeNB and an access mode of the target HeNB;
    performing a verification for the access mode of the target HeNB received from the target HeNB, wherein performing the verification comprises:
        determining that the access mode of the target HeNB received from the target HeNB is a closed access mode, and
        identifying whether the CSG ID is valid for the target HeNB when the access mode of the target HeNB is the closed access mode; and
    transmitting the handover request acknowledgment message to a mobile management entity (MME) based of the verification.

3. A Mobile Management Entity (MME) to perform a handover for a user equipment (UE) in a wireless communication system, the MME comprising:
    a transceiver; and
    a controller configured to:
        control the transceiver to receive, from a source evolved node b (eNB), a handover required message including a closed subscriber group (CSG) identity (ID) of a cell served by a target home eNB (HeNB) and an access mode of the target HeNB,
        perform access control of the UE based on the CSG ID and CSG subscription information of the UE,
        control the transceiver to transmit, to the target HeNB, a handover request message including the CSG ID and a CSG membership status for indicating that the UE is a CSG member,
        control the transceiver to receive, from the target HeNB, a handover request acknowledgement message including the CSG ID of the target HeNB and the access mode,
        perform a verification for the access mode of the target HeNB received from the target HeNB, wherein performing the verification comprises:
            determining that the access mode of the target HeNB received from the target HeNB is a closed access mode, and
            identifying whether the CSG ID is valid for the target HeNB when the access mode of the target HeNB is the closed access mode, and
        control the transceiver to transmit, to the source eNB, a handover command message generated based on the verification.

4. A home evolved Node B (HeNB) gateway to perform a handover for a user equipment (UE) in a wireless communication system, the HeNB gateway comprising:
    a transceiver; and
    a controller configured to control the transceiver to:
        receive, from a source eNB, a handover request message including a closed subscriber group (CSG) identity (ID) of a cell served by a target HeNB and a CSG membership status indicating that the UE is a CSG member,
        control the transceiver to transmit, to the target HeNB, the handover request message,
        control the transceiver to receive, from the target HeNB, a handover request acknowledgement message including the CSG ID of the target HeNB and an access mode of the target HeNB,
        perform a verification for the access mode of the target HeNB received from the target HeNB, wherein performing the verification comprises:
            determining that the access mode of the target HeNB received from the target HeNB is a closed access mode, and
            identifying whether the CSG ID is valid for the target HeNB when the access mode of the target HeNB is the closed access mode, and control the transceiver to transmit the handover request acknowledgment message to a mobile management entity (MIME) based on the verification.

5. The method according to claim 1, wherein if the cell of the HeNB is a hybrid cell, the handover required message includes the access mode of the target HeNB.

6. The method according to claim 1, wherein if the cell of the HeNB is a hybrid cell, the CSG membership status is included in the handover request message.

7. The method according to claim 1, wherein if the access control fails, transmitting a handover preparation failure message.

8. The method according to claim 5, wherein the hybrid cell allows to access both at least one UE subscribed to the CSG ID and a non-subscribed UE subscribed to the CSG ID.

9. The method according to claim 1, wherein if the cell of the HeNB is a hybrid cell, the CSG membership status is included in the handover request message.

10. The method according to claim 9, wherein the hybrid cell allows to access both at least one UE subscribed to the CSG ID and a non-subscribed UE subscribed to the CSG ID.

11. The method according to claim 2, wherein if the cell of the HeNB is a hybrid cell, the CSG membership status is included in the handover request message.

12. The method according to claim 11, wherein the hybrid cell allows to access both at least one UE subscribed to the CSG ID and a non-subscribed UE subscribed to the CSG ID.

13. The MME according to claim 3, wherein if the cell of the HeNB is a hybrid cell, the handover required message includes the access mode of the target HeNB.

14. The MME according to claim 3, wherein if the cell of the HeNB is a hybrid cell, the CSG membership status is included in the handover request message.

15. The MME according to claim 3, wherein if the access control fails, transmitting a handover preparation failure message.

16. The MME according to claim 13, wherein the hybrid cell allows to access both at least one UE subscribed to the CSG ID and a non-subscribed UE subscribed to the CSG ID.

17. The HeNB gateway according to claim 4, wherein if the cell of the HeNB is a hybrid cell, the CSG membership status is included in the handover request message.

18. The HeNB gateway according to claim 17, wherein the hybrid cell allows to access both at least one UE subscribed to the CSG ID and a non-subscribed UE subscribed to the CSG ID.

* * * * *